T. OLDFIELD & J. A. SCHOFIELD.
RESILIENT WHEEL FOR ROAD VEHICLES.
APPLICATION FILED APR. 10, 1909.
958,273.
Patented May 17, 1910.
2 SHEETS—SHEET 2.
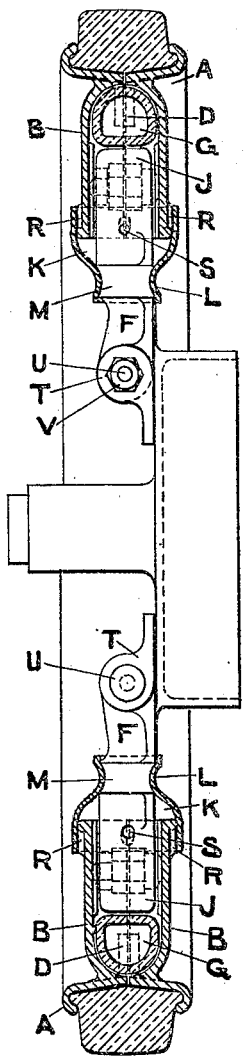
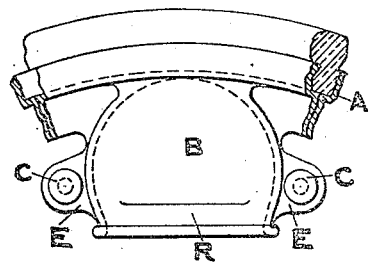
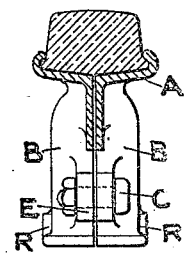
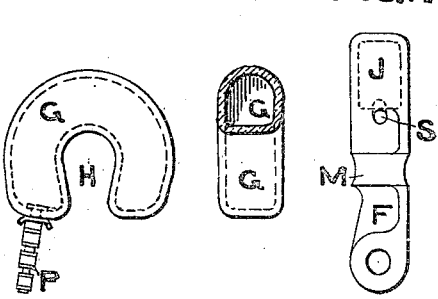

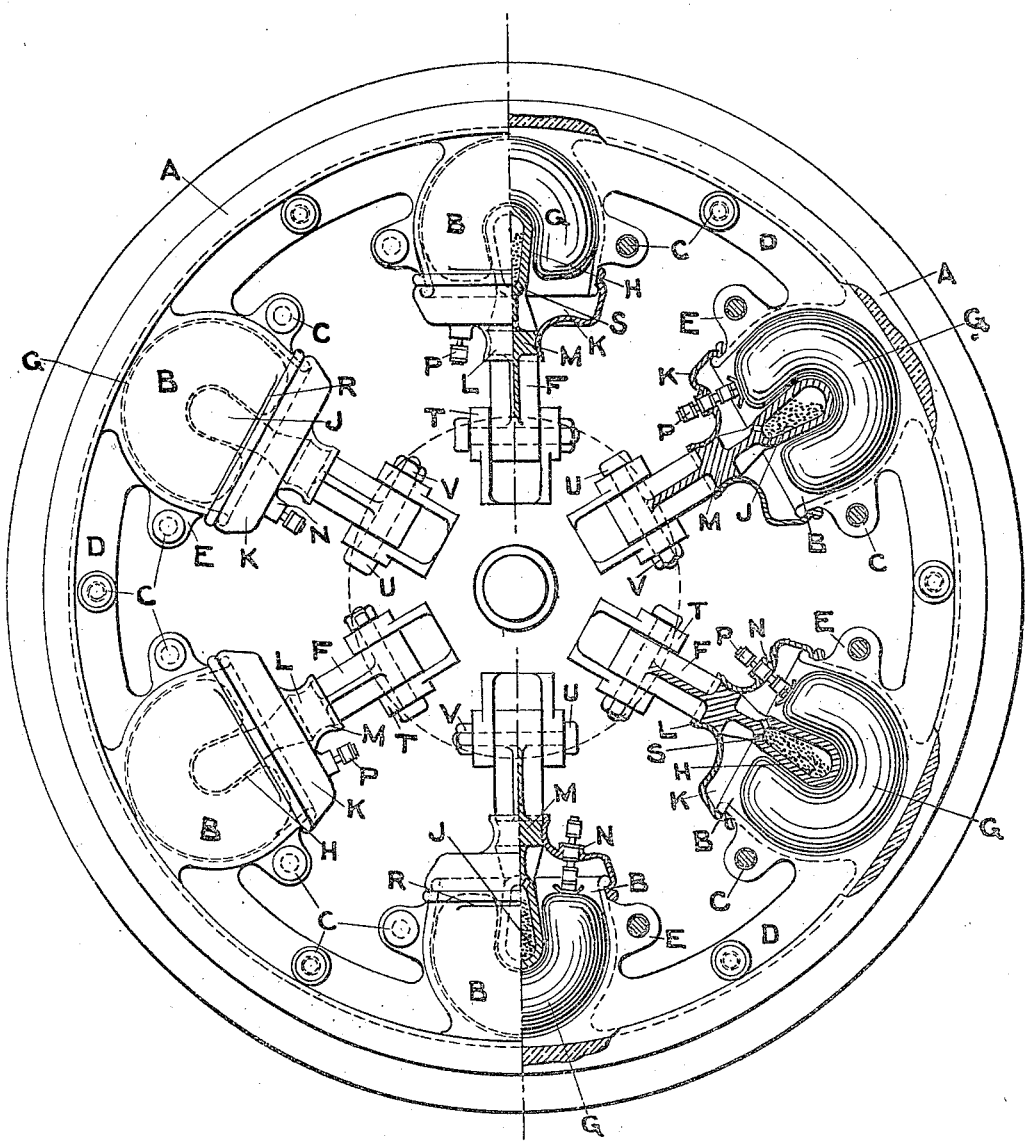

UNITED STATES PATENT OFFICE.

TOM OLDFIELD AND JOSEPH ARTHUR SCHOFIELD, OF HALIFAX, ENGLAND.

RESILIENT WHEEL FOR ROAD-VEHICLES.

958,273. Specification of Letters Patent. Patented May 17, 1910.

Application filed April 10, 1909. Serial No. 489,133.

*To all whom it may concern:*

Be it known that we, TOM OLDFIELD and JOSEPH ARTHUR SCHOFIELD, subjects of the King of Great Britain, residing at Halifax, in the county of York, England, have invented new and useful Improvements in and Relating to Resilient Wheels for Road-Vehicles, of which the following is a specification.

This invention relates to resilient wheels for motor cars and other road vehicles, of the type possessing a solid rubber tire or the like and a rigid outer rim or felly; and our object is, firstly, to provide a more efficient pneumatic or elastic support for the hub portion, by which the transmission of shocks to the body of the vehicle is greatly lessened, or is prevented; secondly to lessen shock and strain when transmitting the drive to the outer rim or felly, or when stopping; and thirdly to construct said wheel of few parts, cheap, and in such a manner that it will have the same effect as a wheel mounting a pneumatic tire, but without any of the disadvantages attending the use of pneumatic tired wheels. In other constructions of motor car wheels, it has been proposed to give an elastic or pneumatic support to the hub portion of the wheel by interposing an inflated tube between the latter and the rigid rim or felly. Another method is the employment of radiating cylinders corresponding in number with the spokes of the wheel, placed around the underside of rim. Within each of these cylinders is a tube, and a block secured to the end of each spoke is free to move radially within each tube. All the tubes are maintained in position within the cylinders by surrounding air tubes or cushions inflated simultaneously from a single air supply. In another construction of wheel the spokes project into a corresponding number of caps rigidly connected to the wheel rim, and have plates rigidly connected to their outer ends. Inside and outside each of the said plates and inclosed by the said caps is an india-rubber cushion or ring against which the spoke ends buffer.

According to our invention, we obtain a more efficient pneumatic or elastic support for the hub portion of the wheel within the rim or felly, by means of suitably formed and separately inflated air cushions, surrounding the ends of the spokes or wheel arms, and fitting within boxes, cups, or the like secured to, cast, or formed preferably upon the underside of said rim. The boxes or cups are preferably divisible in the plane of the wheel.

The separately inflated air cushions or bladders or boxes correspond in number with the number of spokes or arms secured to or formed upon the axle or hub. The ends of the spokes or arms project into the boxes and embed upon and are surrounded by the air cushions or bladders aforesaid. The latter also, in extending between the sides of the spokes and the inner sides of the boxes or bladder chambers in the plane of the wheel, enable an elastic resistance to be offered to said arms in either a radial or circumferential direction. Further the air cushions or bladders are adapted to fit the spoke ends, and the latter are of peculiar shape and hollow. A suitable cover is placed over the open ends of the aforesaid boxes or bladder chambers to keep out grit or other undesirable matter, and to retain therein a suitable lubricant which is automatically discharged from perforations in the hollow end of each spoke, for preventing wear and tear of the bladders by the rubbing action of the spokes during running.

We attain these objects by the mechanism illustrated in the accompanying drawings, in which—

Figure 1 is a side elevation, partly in section, of our improved wheel. Fig. 2 is a sectional end elevation of Fig. 1. Fig. 3 is a side view of a box or cup carrying our specially constructed and shaped inflated bladders or air cushions. Fig. 4 is an end view of Fig. 3. Fig. 5 is a side elevation of inflated bladder or air cushion employed in the construction of our improved wheel. Fig. 6 is a sectional end elevation of Fig. 5. Fig. 7 is an end elevation of detachable wheel spoke or arm employed in the construction of our improved wheel.

Similar letters refer to similar parts throughout the several views.

We construct our improved wheel with a divisional rim or felly A, and secure to, cast or form upon the underside of such rim, a number of boxes or chambers B. Both sections of rim and boxes are bolted together by bolts C passing through web D and lugs E, and the boxes correspond in number with the wheel spokes or arms F. Fitting within each of the aforesaid boxes, cups, or chambers, is an independently inflated cushion, bladder, or tube G resembling a horse shoe in shape, and within the dovetail space H surrounded by the bladder, fits the correspondingly shaped hollow end J of the wheel arms, spokes, or the like. The dovetail or bulbiform shape of the spaces H and spoke ends J, enables the latter to get a better purchase when transmitting the drive, and prevents creeping of the bladders or cushions. A suitable elastic or other cover K is placed over the open end of each bladder chamber B, with a neck L gripping a neck M in each arm F; a further neck N is provided through which projects the bladder valve P. A swell R formed on the sides of the boxes or bladder chambers, is for putting tension on the cover K and retaining the same in position. The grip of the cover and necks upon the boxes, arms, and valve, is such as to render these several joints air and dust-proof, and so keep out grit or other undesirable matter. Further in order to prevent wear of the bladders G from the rubbing action of the spokes or the like F during running, we fill the hollow spoke ends J with French chalk or other suitable lubricant, which is discharged automatically into the bladder chamber through the orifices S, and being retained by the cover K, eventually works between the surfaces in frictional contact. Also we preferably construct the spokes or the like so as to be detachable from the hub, by securing each arm between two lugs T upon the hub, by bolts U and nuts V. By this construction of wheel the ends of the spokes or projections upon the hub portion of the wheel rest upon or are surrounded by separate and independent elastic air cushions or inflated bladders, which permit said hub or axle to move freely and elastically in any direction in the plane of the wheel, and so distribute the weight of the vehicle or its operating forces more or less over the entire circumference of the wheel.

What we claim is:

1. In a wheel, the combination, with a rim provided with chambers for cushions, of arch-shaped cushions arranged in the said chambers, a hub, arms connected with the hub and provided with bulbs on their outer ends which are inserted in the spaces at the middle parts of the cushions, and caps of elastic material secured over the open end portions of the said chambers and around the middle portions of the said arms as set forth.

2. In a wheel, the combination, with a rim provided with chambers for cushions, of arch-shaped cushions arranged in the said chambers, a hub, arms connected with the hub and provided at their outer ends with hollow bulbs for holding lubricating material, said bulbs having perforations at their inner ends for the gradual delivery of the lubricating material to the chambers, and the outer end and middle portions of the said bulbs being inserted in the spaces at the middle parts of the cushions, and caps of elastic material secured over the open end portions of the said chambers and around the middle portions of the said arms as set forth.

In testimony whereof we have signed our names to this specification in the presence of two subscribing witnesses.

TOM OLDFIELD.
JOSEPH ARTHUR SCHOFIELD.

Witnesses:
  ABM. REED,
  E. OLDFIELD.